(12) United States Patent
Lin

(10) Patent No.: US 12,022,450 B2
(45) Date of Patent: Jun. 25, 2024

(54) METHOD FOR COMMUNICATION BETWEEN TWO BASE STATIONS USING A SHARED FREQUENCY BAND, AND CORRESPONDING BASE STATION AND USER DEVICE

(71) Applicant: Orange, Issy-les-Moulineaux (FR)

(72) Inventor: Hao Lin, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 555 days.

(21) Appl. No.: 17/266,558

(22) PCT Filed: Jun. 24, 2019

(86) PCT No.: PCT/FR2019/051538
§ 371 (c)(1),
(2) Date: Feb. 5, 2021

(87) PCT Pub. No.: WO2020/030859
PCT Pub. Date: Feb. 13, 2020

(65) Prior Publication Data
US 2021/0298021 A1    Sep. 23, 2021

(30) Foreign Application Priority Data
Aug. 7, 2018    (FR) ..................................... 1857349

(51) Int. Cl.
*H04W 72/0453*    (2023.01)
*H04W 16/14*    (2009.01)

(52) U.S. Cl.
CPC ....... *H04W 72/0453* (2013.01); *H04W 16/14* (2013.01)

(58) Field of Classification Search
None
See application file for complete search history.

(56) References Cited

U.S. PATENT DOCUMENTS

| 2013/0083779 A1 | 4/2013 | Ahn et al. |
| 2014/0357285 A1* | 12/2014 | Smith ................ H04W 48/18 455/450 |

(Continued)

FOREIGN PATENT DOCUMENTS

WO    WO 2018/059512 A1    4/2018

OTHER PUBLICATIONS

General Dynamics UK Ltd., "D2D resource allocation for synchronization signals and channels", vol. RAN WG1, No. Dresden, Germany, Aug. 17, 2014.

(Continued)

*Primary Examiner* — Brian S Roberts
(74) *Attorney, Agent, or Firm* — Knobbe, Martens, Olson & Bear, LLP (57) ABSTRACT

Mobile telephony operators are starting to use unlicensed frequency bands in order to increase the throughput of their mobile telephony network at a low cost. However, the use of the unlicensed frequency bands has certain drawbacks. It is difficult for a mobile terminal to use unlicensed frequency bands as the number of mobile terminals wishing to use these unlicensed frequency bands remains high given the capacities of these frequency bands. The development allows a user device located in a zone of overlapping radio coverage of two base stations to use a shared frequency band with a greater probability of access to the frequency band, while reducing the impact of interferences generated by communications established between user devices and the base stations to which they are connected.

15 Claims, 4 Drawing Sheets

(56) References Cited

U.S. PATENT DOCUMENTS

| | | | |
|---|---|---|---|
| 2015/0110041 A1* | 4/2015 | Ren | H04W 16/14 |
| | | | 370/329 |
| 2015/0288488 A1* | 10/2015 | Ode | H04W 72/02 |
| | | | 370/312 |
| 2015/0327171 A1 | 11/2015 | Chung et al. | |
| 2017/0054534 A1 | 2/2017 | Sang et al. | |
| 2018/0269962 A1* | 9/2018 | Liu | H04W 16/24 |

OTHER PUBLICATIONS

Medina Daniel et al., "Interference-Aware Dynamic Resource Allocation for D2D Proximity Services with Beamforming Support", 2015 IEEE Global Communications Conference, IEEE, Dec. 6, 2015, pp. 1-7.

International Search Report for International Application No. PCT/FR2019/051538 dated Oct. 2, 2019.

\* cited by examiner

METHOD FOR COMMUNICATION BETWEEN TWO BASE STATIONS USING A SHARED FREQUENCY BAND, AND CORRESPONDING BASE STATION AND USER DEVICE

CROSS-REFERENCE TO RELATED APPLICATIONS

This application is filed under 35 U.S.C. § 371 as the U.S. National Phase of Application No. PCT/FR2019/051538 entitled "METHOD FOR COMMUNICATION BETWEEN TWO BASE STATIONS USING A SHARED FREQUENCY BAND, AND CORRESPONDING BASE STATION AND USER DEVICE" and filed Jun. 24, 2019, and which claims priority to FR 1857349 filed Aug. 7, 2018, each of which is incorporated by reference herein in its entirety.

BACKGROUND

Field

The field of the invention is that of cellular communications. More specifically, the invention relates to the use of unlicensed frequency bands by user devices located in zones of overlapping radio coverage of a plurality of base stations.

Description of the Related Technology

A mobile telephony network is a telephone network that enables a large number of mobile terminals to be used simultaneously.

To achieve this goal, radio access technologies try to distribute a single radio spectrum between the mobile terminals as efficiently as possible.

Generally speaking, a mobile telephony network has a cellular structure that allows the same frequencies of the radio spectrum to be reused several times.

Each mobile telephony operator is allocated one or more frequency bands in the radio spectrum, known as licensed frequency bands, which its base stations use to communicate with the mobile terminals of its users.

With the recent development of multimedia content and applications allowing this content to be streamed, there is a growing demand for throughput that operators are trying to meet. However, the acquisition of new frequency bands represents a substantial cost for mobile telephony operators.

Mobile telephony operators are thus starting to use unlicensed frequency bands, i.e. frequency bands that are not allocated to a specific telephony operator or to a specific use. This allows them to increase the throughput of their mobile telephony network at a low cost.

However, the use of said unlicensed frequency bands has certain drawbacks. More specifically, since such unlicensed frequency bands can be used by all mobile telephony operators, accessibility thereto is reduced and it can take some time before a base station or a mobile terminal is able to communicate using an unlicensed frequency band.

In order to facilitate access to an unlicensed frequency band, communication protocols exist that allow a plurality of mobile terminals to use the same frequency band to communicate, without these mobile terminals being coordinated with one another. One example of such a communication protocol is the LBT (Listen Before Talk) protocol.

Thus, when a device wishes to transmit a signal with a frequency in the unlicensed frequency band, it firstly listens to the transmission channel. In other words, the device listens, in the frequency band in which it is interested, to determine whether another device is transmitting a signal. If, after listening, the device determines that the transmission channel is being used by another device, it does not transmit a signal and waits for a predetermined period of time. Once this predetermined period of time has elapsed, the device listens to the transmission channel again. If, after listening, the device determines that the transmission channel is not being used, it then transmits a signal at a frequency that lies in the unlicensed frequency band.

Although such a solution facilitates access to unlicensed frequency bands, it is still difficult for a mobile terminal to use unlicensed frequency bands as the number of mobile terminals wishing to use these unlicensed frequency bands remains high given the capacities of these frequency bands.

Finally, even if a mobile terminal could use an unlicensed frequency band to communicate, the quality of this communication could be affected by the presence of one or more base stations when the mobile terminal is located in a zone of overlapping radio coverage of these base stations.

There is thus a need to find a solution that allows unlicensed frequency bands to be used by mobile terminals, and that does not suffer from all or part of these drawbacks.

SUMMARY OF CERTAIN INVENTIVE ASPECTS

The invention meets this need by proposing a method for communication between a first base station and at least one second base station, the method being implemented by at least a first user device connected to the first base station and located within a radio coverage zone of the second base station, the method comprising the following steps of:
  receiving a request to change the transmission mode of the second base station transmitted by the first base station in a first frequency band allocated to said first base station in order to communicate with the user devices connected thereto.
  broadcasting, in a second frequency band, that is different from the first frequency band, said request to change the transmission mode of the second base station,
  intercepting a confirmation message broadcasted, in said second frequency band, by at least a second user device connected to the second base station and located within a radio coverage zone of the first base station,
  transmitting the confirmation message in said first frequency band and to the first base station.

Such a communication method allows a user device, such as a mobile terminal, located in a zone of overlapping radio coverage of a first base station and of a second base station, to use a shared frequency band with a greater probability of access to the frequency band, while reducing the impact of interferences generated by communications established between user devices and the base stations to which they are connected.

Generally speaking, a base station transmits radio signals in an omnidirectional manner so as to serve a large number of user devices simultaneously. Thus, communications of a user device, located in a zone of overlapping radio coverage of two base stations, the one to which it is connected and a second base station managed by another mobile telephony operator, transmitted using the shared frequency band are subject to interference.

By changing the transmission mode of the first base station and of the second base station in order to switch from an omnidirectional transmission mode to a directional transmission mode, or by beamforming, the first user device remains within the radio coverage zone of the first base station but is no longer within the coverage zone of the second base station.

The number of user devices within the radio coverage zone of the first base station wishing to use the frequency band is thus reduced, making it easier for the first user device to use the shared frequency band. Moreover, interferences generated by the use of the shared frequency band by the user devices connected to the second base station is reduced since the radio coverage zones of the first and of the second base stations no longer overlap.

According to one feature of the communication method, said request to change the transmission mode of the second base station is broadcasted in a first dedicated time window, said first time window recurring periodically.

At regular time intervals, a time window is reserved to allow requests to change the transmission mode to be transmitted. During this time window, no user device and no base station is transmitting a signal in the shared frequency band. The time, duration and periodicity of this time window are known to the user devices and to the base stations.

Thus, when a user device has a request to change the transmission mode, it implements the LBT protocol before broadcasting the request to change the transmission mode; if the time matches that of the time window, the transmission channel is not being used and the user device can broadcast the request to change the transmission mode.

According to one feature of the communication method, it further comprises the following steps of:
  intercepting a request to change the transmission mode of the first base station broadcasted, in said second frequency band, by said at least one second user device,
  transmitting, in said first frequency band and to the first base station, said request to change the transmission mode of the first base station,
  receiving a confirmation message transmitted by the first base station in said first frequency band,
  broadcasting, in said second frequency band, said confirmation message.

The first base station can also receive a request to change the transmission mode transmitted by the second base station.

In one embodiment of the invention, both the first base station and the second base station can transmit requests to change the transmission mode almost simultaneously.

According to one feature of the communication method, said confirmation message is broadcasted in a second dedicated time window, said second time window recurring periodically.

According to one feature of the communication method, the first dedicated time window and the second dedicated time window comprise a plurality of time slots, each time slot being intended to be used by a user device to broadcast said request to change the transmission mode or said confirmation message.

The invention further relates to a method of transmitting a request to change the transmission mode between a first base station and a second base station, the method being implemented by the first base station and comprising the following steps of:
  transmitting, to at least a first user device connected to the first base station and located within a radio coverage zone of the second base station, and in a first frequency band allocated to said first base station in order to communicate with the user devices connected thereto, a request to change the transmission mode of the second base station,
  receiving a confirmation message transmitted by the first user device in said first frequency band.

According to one feature of the transmission method, it further comprises the following steps of:
  receiving, in said first frequency band, and from the first user device, a request to change the transmission mode of the first base station,
  transmitting, in said first frequency band, a confirmation message to the first user device.

According to one feature of the transmission method, the transmission method further comprises a step of changing the transmission mode of the first base station consisting of switching from an omnidirectional transmission mode to a directional transmission mode.

According to one feature of the transmission method, it comprises, prior to the step of transmitting said request to change the transmission mode of the second base station to the first user device, a step of determining the presence of said first user device in the coverage zone of the second base station.

According to one feature of the transmission method, the step of determining the presence of said first user device in the coverage zone of the second base station consists of determining a value of a strength of a signal received by said first user device.

More specifically, the value of the strength of a received signal is representative of a level of interference to which the received signal is subjected. Thus, the lower the strength of the received signal, the higher the interference level. A user device located in the zone of overlapping radio coverage of the first and second base stations is a user device receiving a signal, the strength whereof is low.

According to one feature of the transmission method, the step of determining the presence of said first user device in the coverage zone of the second base station consists of an absence of confirmation, by the first user device, of having received service messages transmitted by the first base station.

Communications of a user device located in the overlap zone of the first and second base stations are subjected to interference. Thus, an absence of any confirmation of receipt of messages transmitted by the first base station is an indicator of the location of the first user device.

The invention further relates to a user device connected to a first base station and located in a radio coverage zone of a second base station, the user device comprising means for:
  receiving a request to change the transmission mode of the second base station transmitted by the first base station in a first frequency band allocated to said first base station in order to communicate with the user devices connected thereto,
  broadcasting, in a second frequency band, that is different from the first frequency band, said request to change the transmission mode of the second base station,
  intercepting a confirmation message broadcasted, in said second frequency band, by at least a second user device connected to the second base station and located within a radio coverage zone of the first base station,
  transmitting, in said first frequency band and to the first base station, the confirmation message.

Such a device is, for example, a mobile phone or a smartphone.

The invention further relates to a base station adapted to transmit a request to change the transmission mode to at least one other base station, the base station comprising means for:

transmitting, to at least a first user device connected to the base station and located within a radio coverage zone of the other base station, and in a first frequency band allocated to said base station for communication with the user devices connected thereto, a request to change the transmission mode of the other base station.

receiving a confirmation message transmitted by the first user device in said first frequency band, changing the transmission mode of said base station.

Such a base station is, for example, an eNodeB (evolved Node B) when the mobile telephony network is an LTE Advanced, or 4G compliant network, as defined by the 3GPP (3rd Generation Partnership Project) standards organisation.

Such a base station can be a NodeB when the mobile telephony network is a UMTS (Universal Mobile Telecommunications System), or 3G compliant network, as defined by the 3GPP standards organisation.

Finally, the invention relates to a signal intended to be transmitted by a first user device connected to a first base station to a second user device connected to a second base station, the first and second user devices being located in a zone of overlapping radio coverage of the first and second base stations, said signal comprising a request to change the transmission mode of the second base station transmitted by the first base station.

The invention further relates to computer program products comprising program code instructions for implementing methods as described hereinabove, when they are executed by a processor.

The invention further relates to computer-readable recording media on which are recorded computer programs comprising program code instructions for executing the steps of the methods according to the invention as described hereinabove.

Such recording media can be any entity or item capable of storing the programs. For example, the media can include a storage means, such as a ROM, for example a CD-ROM or a microelectronic circuit ROM, or even a magnetic recording means, for example a USB stick or a hard drive.

On the other hand, such recording media can be transmittable media such as an electric or optical signal, which can be carried via an electric or optical cable, by radio, or by other means, such that the computer program contained therein can be executed remotely. The programs according to the invention can in particular be downloaded from a network, for example the Internet network.

Alternatively, the recording media can be an integrated circuit into which the program is incorporated, the circuit being suitable for executing or for use in the execution of the aforementioned display control method.

BRIEF DESCRIPTION OF THE DRAWINGS

Other purposes, features and advantages of the invention will be better understood upon reading the following description, which is given as a rough guide and in no way as a limited guide, with reference to the accompanying figures, in which.

DETAILED DESCRIPTION OF CERTAIN ILLUSTRATIVE EMBODIMENTS

The general principle of the present invention is to enable base stations to switch from an omnidirectional transmission mode to a directional transmission mode, or by beamforming, in order to enable user devices located in a zone of overlapping radio coverage of two base stations to use a frequency band that is not allocated to either of the two base stations in order to improve the quality of communications made by the user devices.

Figure 1:
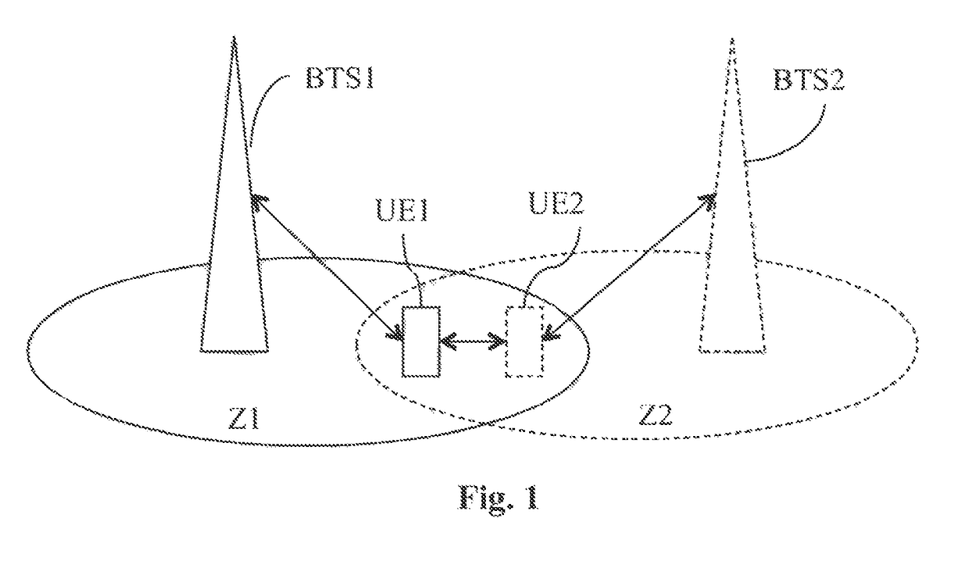
FIG. 1 shows a system wherein the communication and transmission methods according to one embodiment of the invention are implemented.

FIG. 1 shows a system wherein the communication and transmission methods according to one embodiment of the invention are implemented.

The system 1 comprises a first base station BTS1 belonging to a mobile telephony network of a first telecommunications operator. The base station BTS1 transmits radio waves in an omnidirectional manner within a radio coverage zone, or cell, Z1.

A user device UE1 is located in the radio coverage zone Z1 of the base station BTS1. The user device UE1 is connected to the base station UE1 and communicates therewith using a first frequency band allocated to the base station BTS1 in order to communicate with the user devices connected thereto. Although not shown in FIG. 1, a plurality of user devices can be connected simultaneously to the base station BTS1.

The system 1 further comprises a second base station BTS2 belonging to a mobile telephony network of a second telecommunications operator. The base station BTS2 transmits radio waves in an omnidirectional manner within a radio coverage zone, or cell, Z2.

A user device UE2 is located in the radio coverage zone Z2 of the base station BTS2. The user device UE2 is connected to the base station UE2 and communicates therewith using a second frequency band allocated to the base station BTS2 in order to communicate with the user devices connected thereto. Although not shown in FIG. 1, a plurality of user devices can be connected simultaneously to the base station BTS2.

The user devices UE1 and UE2 are located in a zone wherein the radio coverages Z1 and Z2 of the base stations BTS1 and BTS2 overlap. However, the base stations BTS1 and BTS2 are far enough apart from one another that they cannot communicate directly with one another, even through a dedicated communication channel.

The base stations BTS1 and BTS2 are, for example, eNodeBs (evolved Node Bs) when the mobile telephony networks are LTE Advanced. or 4G compliant networks.

The base stations can be NodeBs when the mobile telephony networks are UMTS, or 3G compliant networks.

The base stations BTS1, BTS2 comprise a plurality of radio antennas. The shapes (directivities) of the beams associated with the respective radio signals transmitted by the base stations can be changed by changing the operating mode of the antennas. In a known manner, a distinction is made between an omnidirectional mode and a directional mode. An omnidirectional operating mode is a mode with omnidirectional transmission of the radio signals generally based on one or more omnidirectional antennas or based on a combination of antennas that are not necessarily omnidirectional but the weighted combination whereof results in an omnidirectional beam. A directional operating mode is a mode with directional transmission of the radio signals based on directional antennas, the weighted combination whereof results in a directional beam that points in a direction determined by the weighting. This technique is generally known as beamforming. The arrangement of the antennas on the same base station can be such that they can be combined differently along a horizontal axis and along a vertical axis to obtain a beam, the direction whereof can be adjusted in both a horizontal plane and in a vertical plane (tilt). The beamwidth changes as a function of the weighting of the combination. The shape of the transmitted beam defines the coverage.

The base stations BTS1 and BTS2 communicate with the user devices connected thereto by transmitting and by receiving radio signals, the frequency whereof is comprised in a first frequency band BF1 allocated to the base station BTS1 and a second frequency band BF2 allocated to the base station BTS2. The frequency bands BF1 and BF2 are different and do not overlap, thus limiting interferences when the user devices UE1 and UE2, located in the zone of overlapping radio coverage of the base stations BTS1 and BTS2, communicate with the base station to which they are connected by means of radio signals, the frequency whereof lies in the frequency band BF1, and in the frequency band BF2 respectively.

In order to increase the communications throughput, the base stations BTS1 and BTS2 transmit and receive radio signals having a frequency that lies in a third frequency band BF3. Such a frequency band BF3 is, for example, an unlicensed frequency band, i.e. a frequency band that is not allocated to a specific telephony operator or to a specific use. In another embodiment of the invention, the frequency band BF3 is a shared frequency band allocated to the base stations BTS1 and BTS2. The frequency bands BF1 and BF3 or BF2 and BF3 can be used simultaneously by a base station to communicate with a user device connected thereto.

Figure 2:
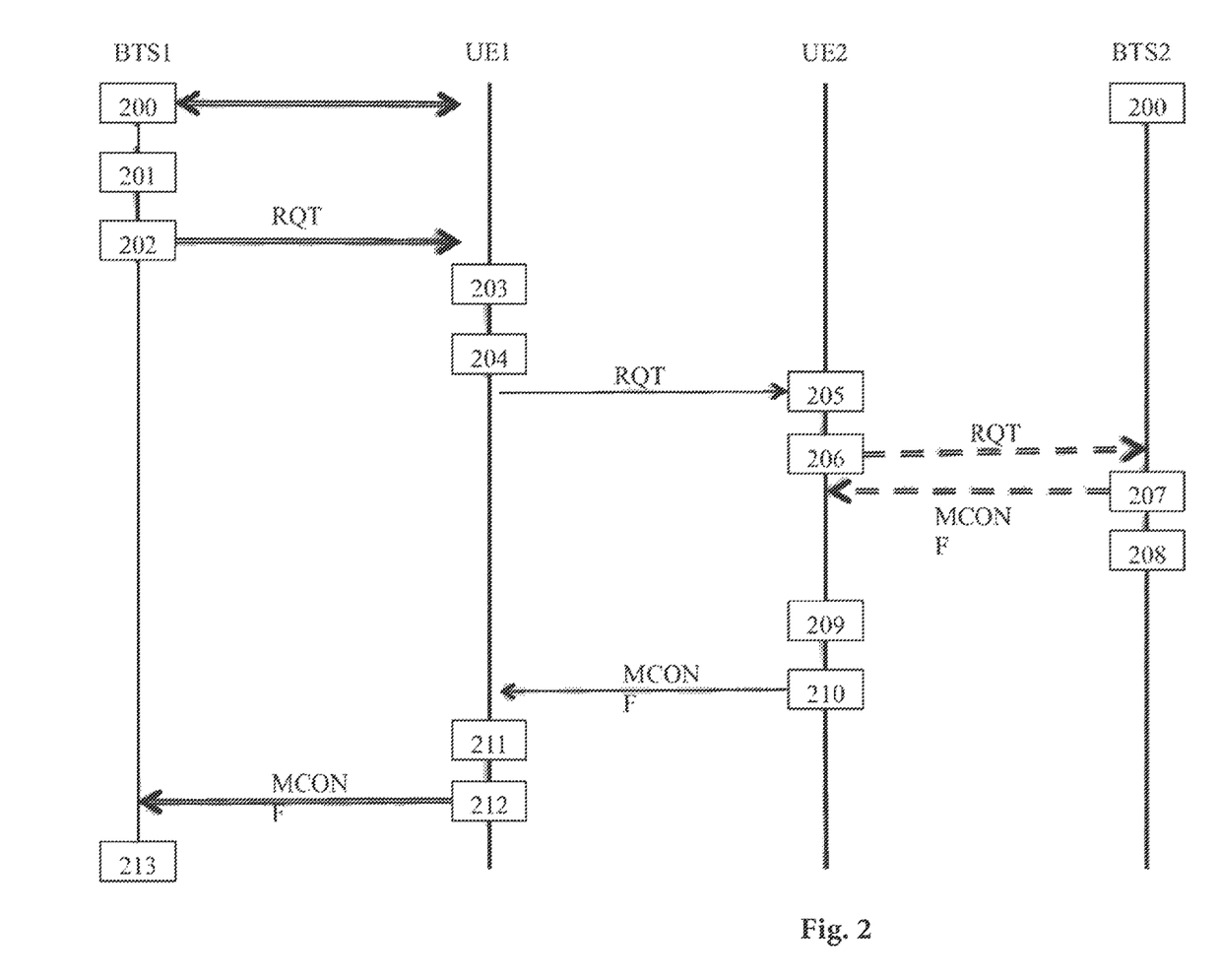
FIG. 2 shows a diagram of the exchanges taking place between the base stations and the user devices connected thereto according to one embodiment of the invention.

FIG. 2 shows a diagram of the exchanges taking place between the base stations BTS1 and BTS2 and the user devices UE1, UE2 connected thereto, enabling these different devices to communicate simultaneously by transmitting radio signals, the frequency whereof lies in the frequency band BF3. With reference to FIG. 2, a double-line arrow represents a radio signal transmission in the frequency band BF1; a dotted double-line arrow represents a radio signal transmission in the frequency band BF2; and a single-line arrow represents a radio signal transmission in the frequency band BF3.

In a step 200, the base station BTS1 selects a user device UE1 to be used as a relay to enable the exchange of messages with the base station BTS2. Such a user device UE1 is located in the zone of overlapping radio coverage of the base station BTS1 and of the base station BTS2.

In one embodiment of the invention, the base station BTS1 determines the presence of the user device UE1 in the zone of overlapping radio coverage of the base stations BTS1 and BTS2 by determining a value of a strength of a radio signal transmitted by the base station BTS1 and received by the user device UE1 or RSSI (Received Signal Strength Indication).

More specifically, the value of the strength of a received radio signal is representative of a level of interference to which the received radio signal is subjected. Thus, the lower the strength of the received radio signal, the higher the interference level. A user device located in the zone of overlapping radio coverage of the base stations BTS1 and BTS2 is a user device receiving a radio signal, the strength whereof is low.

In another embodiment, the base station BTS1 determines the presence of the user device UE1 in the zone of overlapping radio coverage of the base stations BTS1 and BTS2 by detecting an absence of confirmation, by the user device UE1, of having received service messages transmitted by the base station BTS1.

Communications of a user device located in the overlap zone of the base stations BTS1 and BTS2 are subjected to interference. Thus, an absence of any confirmation of having received messages transmitted by the base station BTS1 is an indicator of the location of the user device UE1.

Regardless of the embodiment applied, exchanges taking place between the base station BTS1 and the user device UE1 are made by transmitting a radio signal, the frequency whereof lies in the frequency band BF1.

Similarly, the base station BTS2 implements the step 200 in order to select a user device UE2 to be used as a relay to enable the exchange of messages with the base station BTS1.

Regardless of the embodiment applied, exchanges taking place between the base station BTS2 and the user device UE2 are made by transmitting a radio signal, the frequency whereof lies in the frequency band BF2.

In a step 201, the base station BTS1 determines that criteria for triggering a change of the transmission mode of the base station BTS1 are met. In the example described hereinbelow, the base station BTS 1 is in the omnidirectional transmission mode and triggers a change of the transmission mode in order to switch to a directional transmission mode. In another embodiment of the invention, the base station BTS1 is in the directional transmission mode and triggers a change of the transmission mode in order to switch to an omnidirectional transmission mode. Regardless of the embodiment applied, the steps implemented are the same.

The criteria triggering a change of the transmission mode are, for example, the number of user devices present in the zone of overlapping radio coverage of the base stations BTS1 and BTS2. For example, if there is more than a certain number of user devices present in the zone of overlapping radio coverage of the base stations BTS1 and BTS2, then the base station BTS1 triggers a change of the transmission mode to a directional transmission mode. If there is less than a certain number of user devices present in the zone of overlapping radio coverage of the base stations BTS1 and BTS2, then the base station BTS1 triggers a change of the transmission mode to an omnidirectional transmission mode.

Other criteria can be, for example, an interference level determined by the base station using RSSI measurements.

In the omnidirectional transmission mode, antennas of the base station BTS1, BTS2 are configured such that radio signals are transmitted in all directions. This means that, regardless of the position of a user terminal UE1 in the coverage zone Z1, Z2 of the base station BTS1, BTS2, it can receive the radio signals transmitted by the base station BTS1, BTS2.

Figure 3:
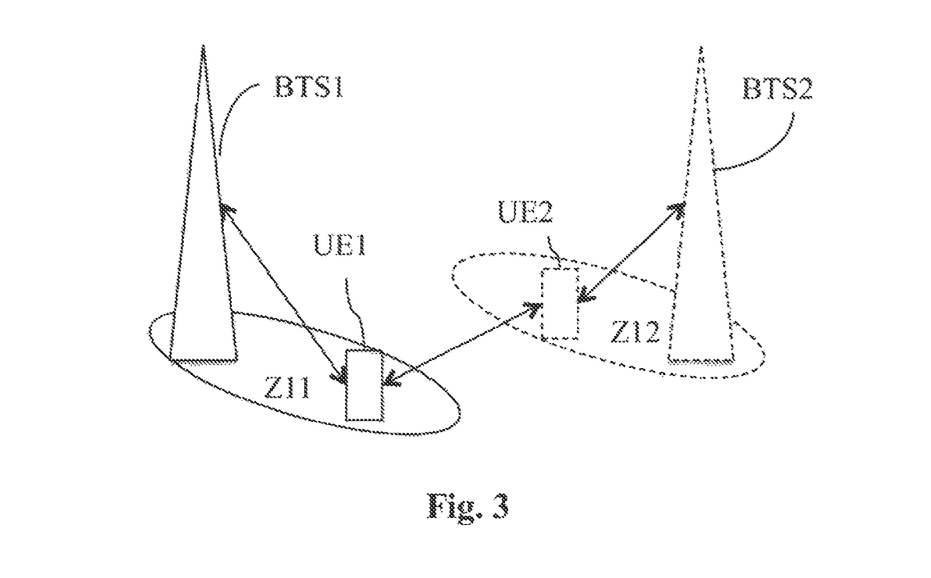
FIG. 3 shows the system in the figure when the base stations are in the directional transmission mode.

In the directional transmission mode, as shown in FIG. 3, antennas of the base station BTS1, BTS2 are configured such that radio signals are transmitted in a specific direction.

The beam of radio waves thus transmitted covers a specific part of the coverage zone Z1, Z2 of the omnidirectional operating mode of the base station BTS1, BTS2 defining a new coverage zone Z11, Z12. If a user terminal UE1 is located in the coverage zone Z11, Z12 of such a beam, it can receive the radio signals transmitted by the base station BTS1, BTS2 in the frequency band BF3 with minimum interference.

Thus, switching from one transmission mode to another amounts to changing the configuration of the antennas of the base station BTS1, BTS2.

In a step 202, the base station BTS1 transmits a request to change the transmission mode RQT of the base station BTS2 to the user device UE1 selected to act as a relay. If a plurality of user devices has been selected to act as a relay, they all receive the request to change the transmission mode of the base station BTS2. The request to change the transmission mode of the base station BTS2 is transmitted by the base station BTS1 in the frequency band BF1.

Upon receiving the request to change the transmission mode RQT of the base station BTS2, and in a step 203, the user device UE1 listens, according to the LBT protocol, to determine whether another user device is transmitting a radio signal in the frequency band BF3 since the frequency band BF3 is a shared-access frequency band.

In a step 204, if, after listening, the user device UE1 determines that the frequency band BF3 is not in use, it broadcasts the request to change the transmission mode RQT of the base station BTS2 in the frequency band BF3.

In one embodiment of the invention, a time window FRQT dedicated to the broadcasting of the request to change the transmission mode RQT of the base station BTS2 is defined. Such a time window FRQT, shown in FIG. 4, occurs periodically, for example every second. The periodicity T of the time window FRQT is known to the various devices of the telephony networks concerned, whether they are base stations or user devices.

Figure 4:
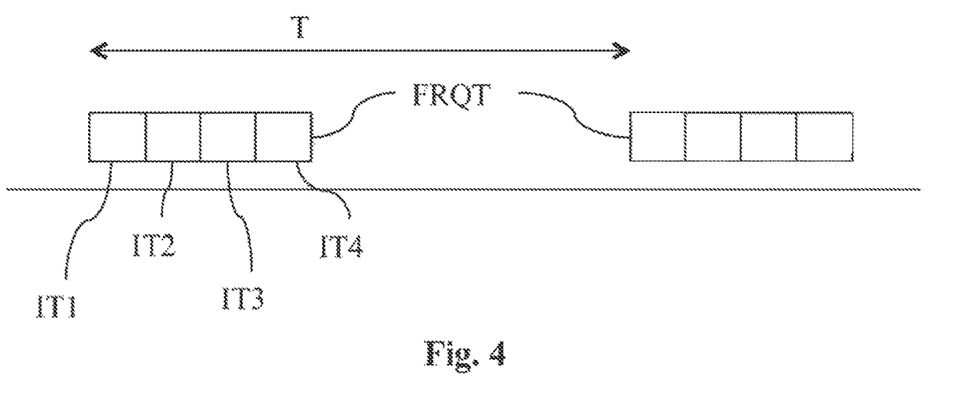
FIG. 4 shows a time window FRQT.

Each time window FRQT is broken down into a plurality of time slots, in this case four time slots IT1, IT2, IT3 and IT4.

In this embodiment of the invention, during the step 204, the user device UE1 selects one of the time slots IT1-IT4 during which the request to change the transmission mode RQT of the base station BTS2 is broadcasted in the frequency band BF3.

The use of a time window FRQT dedicated to broadcasting the request to change the transmission mode RQT of the base station BTS2 allows time periods to be reserved, during which the frequency band BF3 is not in use. This ensures that a user device UE1 with a request to change the transmission mode RQT of the base station BTS2 to be transmitted is assured of being able to transmit a signal in the frequency band BF3 without risk of interference. More specifically, since the times of the time windows FRQT are known, only the user devices acting as a relay and having received the request to change the transmission mode RQT of the base station BTS2 are authorised to broadcast radio signals.

In a step 205, a user device UE2 connected to the base station BTS2 intercepts the request to change the transmission mode RQT of the base station BTS2 broadcasted in the frequency band BF3 regardless of the time slot IT1-IT4 of the time window FRQT in which it was broadcasted.

In a step 206, the user device UE2 transmits the request to change the transmission mode RQT of the base station BTS2 to the base station BTS2. If a plurality of user devices has been selected to act as relays, they all transmit the request to change the transmission mode RQT of the base station BTS2 to the base station BTS2. The request to change the transmission mode of the base station BTS2 is transmitted by the user device UE2 in the frequency band BF2.

In a step 207, the base station BTS2 transmits a change of transmission mode confirmation message MCONF to the user device UE2 selected to act as a relay. If a plurality of user devices has been selected to act as a relay, they all receive the change of transmission mode confirmation message MCONF. The change of transmission mode confirmation message MCONF is transmitted by the base station BTS2 in the frequency band BF2.

In a step 208, the base station BTS2 switches to the directional transmission mode.

In a step 209, upon receiving the change of transmission mode confirmation message MCONF, the user device UE2 listens, according to the LBT protocol, to determine whether another user device is transmitting a radio signal in the frequency band BF3.

In a step 2010, if, after listening, the user device UE2 determines that the frequency band BF3 is not in use, it broadcasts the change of transmission mode confirmation message MCONF in the frequency band BF3.

In one embodiment of the invention, a time window FMCONF dedicated to the broadcasting of the change of transmission mode confirmation message MCONF is defined. Such a time window FMCONF, shown in FIG. 5, occurs periodically, for example every second. The periodicity T of the time window FMCONF is known to the various devices of the telephony networks concerned, whether they are base stations or user devices.

Figure 5:
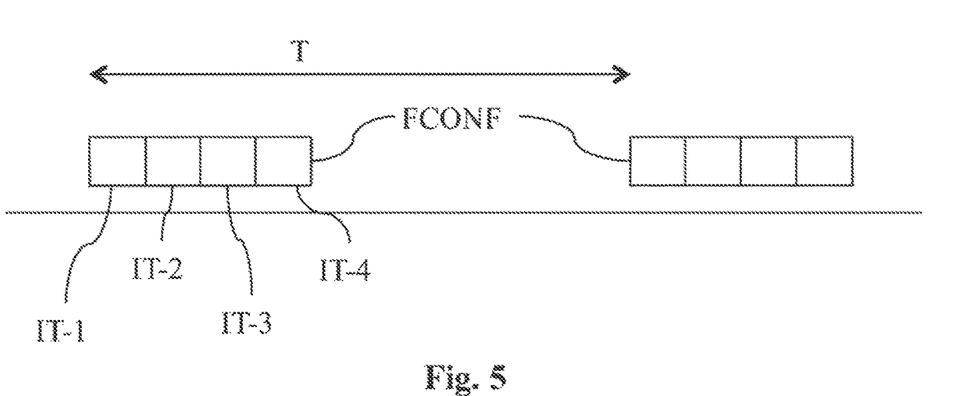
FIG. 5 shows a time window FMCONF, FIG. 6 diagrammatically shows a base station according to one embodiment of the invention.

Each time window FMCONF is broken down into a plurality of time slots, in this case four time slots IT-4, IT-2, IT-3 and IT-4.

In this embodiment of the invention, during the step 210, the user device UE2 selects one of the time slots IT-1-IT-4 during which the change of transmission mode confirmation message MCONF is broadcasted in the frequency band BF3.

The use of a time window FCONF dedicated to broadcasting the change of transmission mode confirmation message MCONF allows time periods to be reserved, during which the frequency band BF3 is not in use. Thus, a user device UE2 with a change of transmission mode confirmation message MCONF to be transmitted is assured of being able to transmit a signal in the frequency band BF3 without risk of interference, in particular without interfering with an occurrence of a time window FRQT. More specifically, since the times of the time windows FRQT and FMCONF are known, only the user devices acting as a relay and having received the change of transmission mode confirmation message MCONF are authorised to broadcast radio signals during a time window FCONF.

In a step 211, the user device UE1 connected to the base station BTS1 intercepts the change of transmission mode confirmation message MCONF broadcasted in the frequency band BF3 regardless of the time slot IT-1-IT-4 of the time window FMCONF in which it was broadcasted.

In a step 212, the user device UE1 transmits the change of transmission mode confirmation message MCONF to the base station BTS1. If a plurality of user devices has been selected to act as a relay, they all transmit the change of transmission mode confirmation message MCONF to the base station BTS1. The change of transmission mode confirmation message MCONF is transmitted by the user device UE1 in the frequency band BF1.

In a step 213, the base station BTS1 also switches to the directional transmission mode.

Although described as having been initiated by the base station BTS1, the method according to the invention can, symmetrically, be initiated by the base station BTS2.

In one embodiment of the invention, in order to switch to an omnidirectional transmission mode, the base stations STB1 and STB2 can re-implement the steps of the method described hereinabove.

In another embodiment, the base stations STB1 and STB2 switch to the omnidirectional transmission mode after a predetermined time has elapsed.

Figure 6:
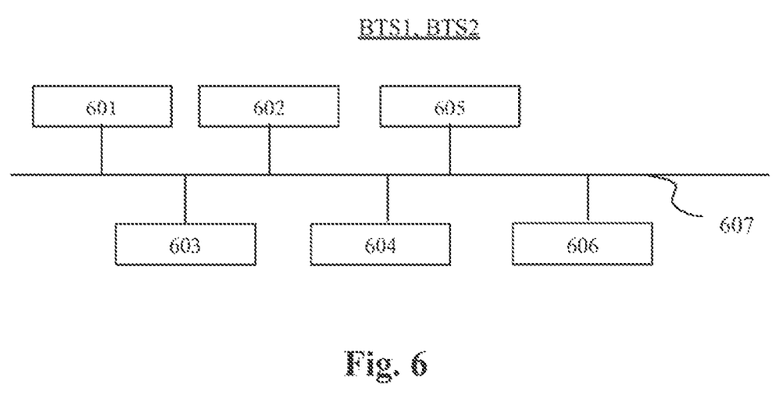

FIG. 6 diagrammatically shows a base station BTS1, BTS2 according to one embodiment of the invention.

The base station BTS1, BTS2 can comprise at least one processor 601, a storage unit 602, an input device 603, a display device 604, an interface 605, and at least one network interface 606 which are connected to one another via a bus 607. It goes without saying that the component elements of the base station BTS1, BTS2 can be connected by means of a connection that is different from a bus.

The processor 601 controls the operations of the base station BTS1, BTS2. The storage unit 202 stores at least one program for implementing a method according to one embodiment of the invention to be executed by the processor 601, and various data, such as parameters used for computations carried out by the processor 601, and intermediate data for computations carried out by the processor 601, etc. The processor 601 can be formed by any known and suitable hardware or software, or by a combination of hardware and software. For example, the processor 601 can be formed by dedicated hardware such as a processing circuit, or by a programmable processing unit such as a central processing unit that executes a program stored in a memory thereof.

The storage unit 602 can be formed by any suitable means capable of storing the one or more programs and data in a computer-readable manner. Examples of a storage unit 602 comprise computer-readable non-transitory storage media such as solid-state memory devices and magnetic, optical or magneto-optical recording media loaded on a read/write unit.

The input device 603 can be formed by a keyboard, a pointing device such as a mouse to be used by a user to enter commands. The display device 604 can also be formed by a display module, such as a graphical user interface or GUI. The input device 603 and the display device 604 can be integrally formed by a touch-sensitive screen, for example.

The interface 605 provides an interface between the base station BTS1, BTS2 and an external appliance. The interface 605 can communicate with the external appliance via a wired or wireless connection.

At least one network interface 606 provides a connection between the base station BTS1, BTS2 and user devices via a communication network.

Figure 7:
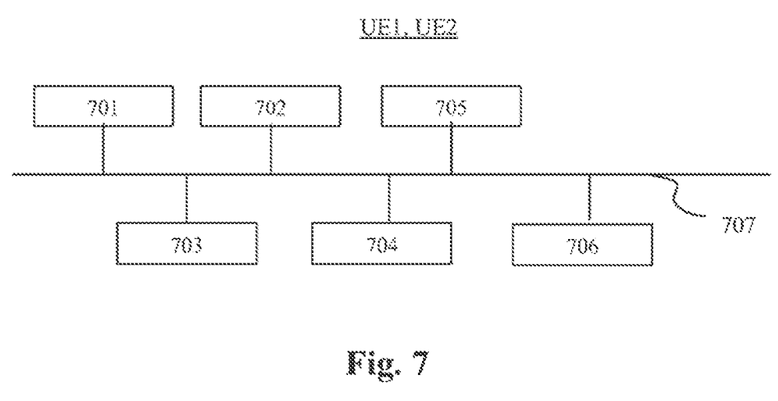
FIG. 7 diagrammatically shows a user device according to one embodiment of the invention.

FIG. 7 diagrammatically shows a user device UE1, UE2 according to one embodiment of the invention.

The user device UE1, UE2 can comprise at least one hardware processor 701, a storage unit 702, an input device 703, a display device 704, an interface 705, and at least one network interface 706 which are connected to one another via a bus 707. It goes without saying that the component elements of the user device UE1. UE2 can be connected by means of a connection that is different from a bus.

The processor 701 controls the operations of the user device UE1, UE2. The storage unit 702 stores at least one program for implementing a method according to one embodiment of the invention to be executed by the processor 701, and various data, such as parameters used for computations carried out by the processor 701, and intermediate data for computations carried out by the processor 701, etc. The processor 701 can be formed by any known and suitable hardware or software, or by a combination of hardware and software. For example, the processor 701 can be formed by dedicated hardware such as a processing circuit, or by a programmable processing unit such as a central processing unit that executes a program stored in a memory thereof.

The storage unit 702 can be formed by any suitable means capable of storing the one or mon programs and data in a computer-readable manner. Examples of a storage unit 702 comprise computer-readable non-transitory storage media such as solid-state memory devices and magnetic, optical or magneto-optical recording media loaded on a read/write unit.

The input device 703 can be formed by a keyboard, a pointing device such as a mouse to be used by a user to enter commands. The display device 704 can also be formed by a display module, such as a graphical user interface or GUI. The input device 703 and the display device 704 can be integrally formed by a touch-sensitive screen, for example.

The interface 205 provides an interface between the user device UE1. UE2 and an external appliance such as another user device. The interface 705 can communicate with the external appliance via a wired or wireless connection.

At least one network interface 706 provides a connection between the user device UE1, UE2 and a base station BTS1, BTS2 via a communication network.

The invention claimed is:

1. A method of communication between a first base station and at least one second base station, the method being implemented by at least a first user device connected to the first base station and located within a radio coverage zone of the second base station, the method comprising:
   receiving a request to change an omnidirectional or directional transmission mode of the second base station transmitted by the first base station in a first frequency band allocated to the first base station in order to communicate with the user devices connected thereto;
   broadcasting, in a second frequency band, that is different from the first frequency band, the request to change the transmission mode of the second base station;
   intercepting a confirmation message broadcasted, in the second frequency band, by at least a second user device connected to the second base station and located within a radio coverage zone of the first base station; and
   transmitting the confirmation message in the first frequency band and to the first base station.

2. The communication method of claim 1, wherein the request to change the transmission mode of the second base station is broadcasted in a first dedicated time window, the first time window recurring periodically.

3. The communication method of claim 2, wherein the first or second dedicated time window comprises a plurality of time slots, each time slot being intended to be used by a user device to broadcast the request to change the transmission mode or the confirmation message.

4. The communication method of claim 1, further comprising:
   intercepting a request to change the transmission mode of the first base station broadcasted, in the second frequency band, by the at least one second user device;
   transmitting, in the first frequency band and to the first base station, the request to change the transmission mode of the first base station;

receiving a confirmation message transmitted by the first base station in the first frequency band; and broadcasting, in the second frequency band, the confirmation message.

5. The communication method of claim 4, wherein the confirmation message is broadcasted in a second dedicated time window, the second time window recurring periodically.

6. A computing environment comprising a processor and a memory, the memory storing program code instructions executed by the processor for implementing the method according to claim 1.

7. A method of transmitting a request to change an omnidirectional or directional transmission mode between a first base station and a second base station, the method being implemented by the first base station and comprising:

transmitting, to at least a first user device connected to the first base station and located within a radio coverage zone of the second base station, and in a first frequency band allocated to the first base station in order to communicate with the user devices connected thereto, a request to change the transmission mode of the second base station; and receiving a confirmation message transmitted by the first user device in the first frequency band.

8. The transmission method of claim 7, further comprising:

receiving, in the first frequency band, and from the first user device, a request to change the transmission mode of the first base station; and transmitting, in the first frequency band, a confirmation message to the first user device.

9. The transmission method of claim 7, wherein the transmission method further comprises changing the transmission mode of the first base station consisting of switching from an omnidirectional transmission mode to a directional transmission mode.

10. The transmission method of claim 7, further comprising, prior to transmitting the request to change the transmission mode of the second base station to the first user device, determining the presence of the first user device in the coverage zone of the second base station.

11. The transmission method of claim 10, wherein determining the presence of the first user device in the coverage zone of the second base station consists of determining a value of a strength of a signal received by the first user device.

12. The transmission method of claim 10, wherein determining the presence of the first user device in the coverage zone of the second base station consists of an absence of confirmation, by the first user device, of having received service messages transmitted by the first base station.

13. A user device connected to a first base station and located in a radio coverage zone of a second base station, the user device comprising means for:

receiving a request to change the omnidirectional or directional transmission mode of the second base station transmitted by the first base station in a first frequency band allocated to the first base station in order to communicate with the user devices connected thereto;

broadcasting, in a second frequency band, that is different from the first frequency band, the request to change the transmission mode of the second base station;

intercepting a confirmation message broadcasted, in the second frequency band, by at least a second user device connected to the second base station and located within a radio coverage zone of the first base station; and transmitting, in the first frequency band and to the first base station, the confirmation message.

14. A base station adapted to transmit a request to change the omnidirectional or directional transmission mode to at least one other base station, the base station comprising:

means for transmitting, to at least a first user device connected to the base station and located within a radio coverage zone of the other base station, and in a first frequency band allocated to the base station for communication with the user devices connected thereto, a request to change the transmission mode of the other base station;

means for receiving a confirmation message transmitted by the first user device in the first frequency band; and means for changing the transmission mode of the base station.

15. A non-transitory computer-readable storage medium storing program code instructions that cause a first user device connected to a first base station to transmit a signal to a second user device connected to a second base station, the first and second user devices being located in a zone of overlapping radio coverage of the first and second base stations, the signal comprising a request to change the transmission mode of the second base station transmitted by the first user device.

* * * * *

UNITED STATES PATENT AND TRADEMARK OFFICE
CERTIFICATE OF CORRECTION

PATENT NO. : 12,022,450 B2
APPLICATION NO. : 17/266558
DATED : June 25, 2024
INVENTOR(S) : Hao Lin Page 1 of 1

It is certified that error appears in the above-identified patent and that said Letters Patent is hereby corrected as shown below:

In the Specification

Column 2, Line 39, delete "thereto." and insert -- thereto, --.

Column 5, Line 10, delete "station." and insert -- station, --.

Column 6, Line 9, delete "invention." and insert -- invention, --.

Column 6, Line 61, delete "Advanced." and insert -- Advanced, --.

Column 8, Line 35, delete "BTS 1" and insert -- BTS1 --.

Column 10, Line 35, delete "IT-4," and insert -- IT-1, --.

Column 11, Line 62, delete "UE1." and insert -- UE1, --.

Column 12, Line 11, delete "mon" and insert -- more --.

Column 12, Line 24, delete "UE1." and insert -- UE1, --.

Signed and Sealed this
Eighth Day of October, 2024

Katherine Kelly Vidal
*Director of the United States Patent and Trademark Office*